United States Patent [19]

Ando et al.

[11] 4,259,893

[45] Apr. 7, 1981

[54] FLUID PRESSURE OPERATED SERVOMOTOR

[75] Inventors: Hiromi Ando, Tokyo; Kiyoshi Tateoka, Fujisawa; Yoshihiro Hayashida, Chigasaki, all of Japan

[73] Assignee: Tokico Ltd., Kawasaki, Japan

[21] Appl. No.: 961,022

[22] Filed: Nov. 15, 1978

[30] Foreign Application Priority Data

Nov. 19, 1977 [JP] Japan ............................ 52-155957[U]

[51] Int. Cl.³ ................................................ F15B 9/10
[52] U.S. Cl. .................................. 91/369 B; 91/376 R
[58] Field of Search ............. 91/369 B, 369 R, 369 A

[56] References Cited

U.S. PATENT DOCUMENTS

| 2,900,962 | 8/1959 | Ingres | 91/369 B |
|---|---|---|---|
| 2,980,068 | 4/1961 | Stelzer | 91/369 B |
| 4,043,251 | 8/1977 | Phmi | 91/369 B |
| 4,069,742 | 1/1978 | Gephort | 91/369 B |
| 4,100,839 | 7/1978 | Ando | 91/369 B |

FOREIGN PATENT DOCUMENTS

| 2337323 | 2/1975 | Fed. Rep. of Germany | 91/369 B |
| 2461200 | 7/1975 | Fed. Rep. of Germany | 91/369 B |

*Primary Examiner*—Paul E. Maslousky
*Attorney, Agent, or Firm*—Wenderoth, Lind & Ponack

[57] ABSTRACT

A fluid pressure operated servomotor such as a vacuum booster including a power piston having a differential pressure acting thereacross, an input rod for actuating a valve mechanism mounted in the power piston, a reaction lever disposed between the power piston and an output rod for transmitting a force to the output rod and transmitting a reaction force to the input rod. A return spring for urging the power piston in the return direction acts through the reaction lever on the power piston, whereby the reaction force is not transmitted to the input rod until the force transmitted to the output rod exceeds a predetermined value.

4 Claims, 5 Drawing Figures

FLUID PRESSURE OPERATED SERVOMOTOR

BACKGROUND OF THE INVENTION

This invention relates to a fluid pressure operated servomotor such as a vacuum booster or the like for use in a vehicle hydraulic braking system or the like.

A great variety of fluid pressure operated servomotors have been proposed and used in practice in vehicle hydraulic braking systems. One of prior art servomotors, such as shown in U.S. Pat. No. 3981227, comprises a main body which is divided into two air-tight chambers by means of a diaphragm-power piston unit connected to an output rod, an input rod for actuating a valve mechanism, and a reaction lever for transmitting the reaction force of a force generated in the output rod to the input rod. The reaction lever acts to transmit the reaction force simultaneously with the generation of the output force in the output rod, so that when the servomotor is used in the vehicle braking system, a reaction force will be transmitted to the input rod or to a brake pedal at the initial stage of the brake application when the output force is not sufficiently large to effectively apply the brake, which is not preferable for a good operational feeling of the brake pedal.

In order to eliminate the disadvantage referred to hereinabove, an improved servomotor has been proposed as shown in Japanese Utility Model Publication No. 53434/1976, in which a return spring urging the power piston unit in the return direction is utilized to act on the reaction lever through a retainer. The retainer is slidably mounted on a bolt threadedly secured to the power piston, and in the unactuated condition of the servomotor the force of the return spring is transmitted to the power piston through the retainer. Thus, there are problems that the construction is complicated, the assembling operation is not easy, and the amount of the reaction force will change according to the sliding resistance between the bolt and the retainer.

SUMMARY OF THE INVENTION

An object of the present invention is to provide a fluid pressure operated servomotor which can effectively eliminate the disadvantages inherent in the prior art servomotors described hereinabove.

According to the present invention there is provided a fluid pressure operated servomotor of the type including a main body which is divided into a front chamber and a rear chamber by a diaphragm and a power piston secured to the diaphragm, a valve mechanism disposed in the power piston for controlling the pressure in at least one of the two chambers in association with an input rod, and a plurality of reaction levers disposed radially with respect to the axis of the servomotor and being adapted to transmit an output force from the power piston to an output rod, wherein each of the reaction levers is rockingly mounted on a fulcrum formed on one end surface or the front surface of the power piston, and engages with a return spring urging the power piston in the return or the rearward direction at a position radially outwards of the fulcrum, and engages also with the output rod at a position radially inwards of the fulcrum. Thus, when the output force exceeds a predetermined amount, the reaction levers rockingly move around the fulcrums and transmit reaction force to the input rod.

The above and other objects and attendant advantages of the present invention will be more readily apparent to those skilled in the art from a reading of the following detailed description in conjunction with the accompanying drawings which show some embodiments of the present invention for illustration only, but not for limiting the scope of the same in any way.

DESCRIPTION OF PREFERRED EMBODIMENTS

Figure 1:
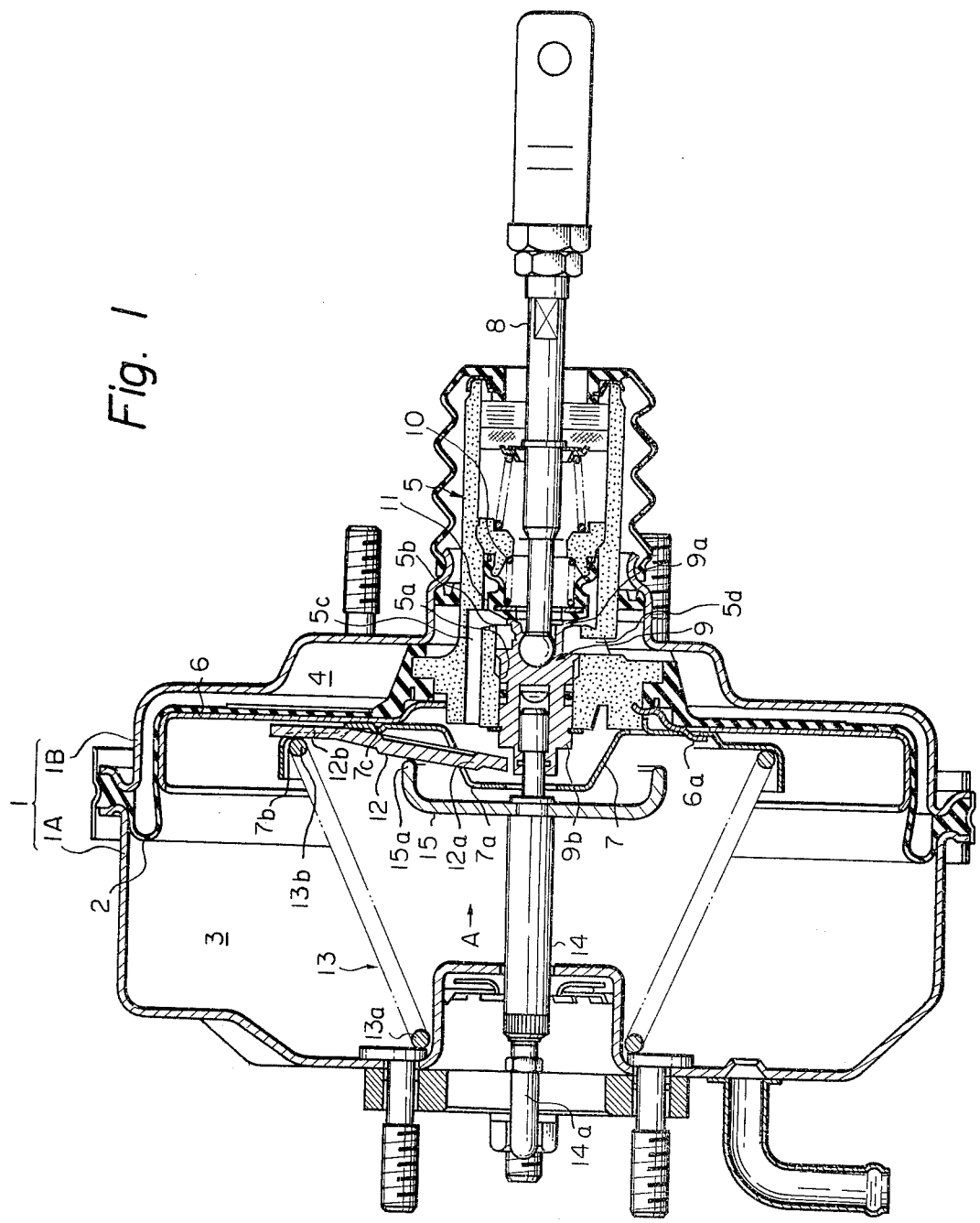
FIG. 1 is a longitudinal cross-section of a fluid pressure operated servomotor or a vacuum booster according to the present invention.

Referring to FIG. 1, a casing or main body 1 of a servomotor according to the invention is constituted of a front shell 1A and a rear shell 1B. The interior of the main body 1 is divided into a front chamber 3 and a rear chamber 4 by a diaphragm 2 and a power piston attached to the diaphragm 2. In the embodiment, the power piston comprises a valve body 5 and a piston plate 6 which are integrally secured to the inner circumference of the diaphragm 2 for holding the same therebetween, and a retaining plate 7 secured to the piston plate 6 by means of finger portions 6a being cut out of and raised from the piston plate 6 to engage respectively with in openings 7a formed in the retaining plate 7.

The piston plate 6 and the retaining plate 7 are exposed to the front chamber 3. The valve body 5 sealingly extends through the rear chamber 4 to the outside of the main body 1 and is slidable in the direction of the axis of the servomotor, or in the directions leftward and rightward as viewed in FIG. 1 (which are respectively referred in the specification as the forward and rearward directions). The front chamber 3 is permanently connected to a source of vacuum pressure such as an intake manifold of an engine of a vehicle.

An input rod 8 and a plunger 9 constitute an input shaft assembly. The rear end of the input rod 8 is adapted to be connected to a brake pedal (not shown), and a ballshaped forward end of the input rod 8 is received in a recess formed in the rear end of the plunger 9 and connected thereto so that the input rod 8 and the plunger 9 can move integrally in the direction of the axis of the servomotor. The plunger 9 is slidably received in a cylinder portion 5a of the valve body 5.

Valve seats 9a and 5b are respectively formed on the rear ends of the plunger 9 and the cylinder portion 5a of the valve body 5 for cooperating with a poppet valve 11 in response to the movement of the plunger 9 with respect to the valve body 5. A spring 10 is positioned to urge the poppet valve 11 toward the valve seats 9a and 5b.

In the unactuated condition of the servomotor shown in FIG. 1, the poppet valve 11 engages with the valve seat 9a and is separated from the valve seat 5b, whereby the front chamber 3 is communicated with the rear chamber 4 through axial and radial passages 5c and 5d, and is isolated from the atmospheric pressure. It will be noted that the space rearward of the poppet valve 11 in the valve body 5 is permanently communicated with the atmosphere.

Figure 2:
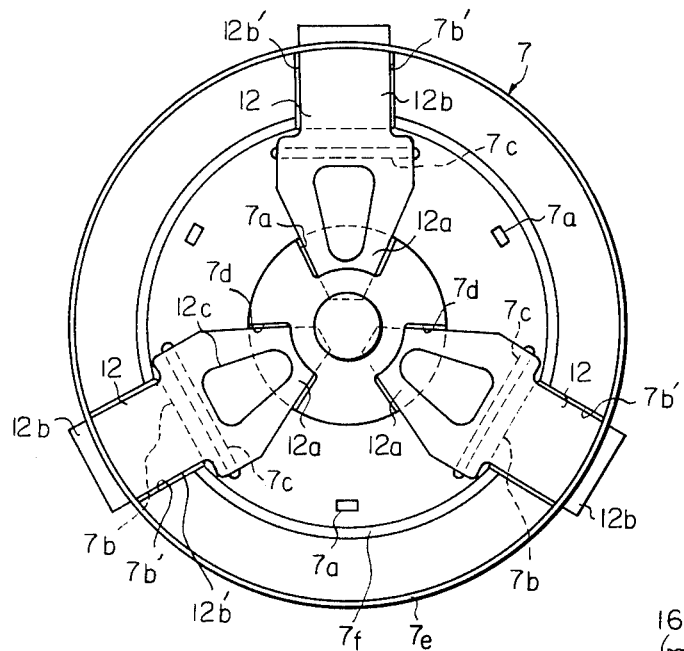
FIG. 2 is a view showing reaction levers and a retaining plate of the servomotor of FIG. 1 as viewed in the direction of the arrow A.
Figure 3:
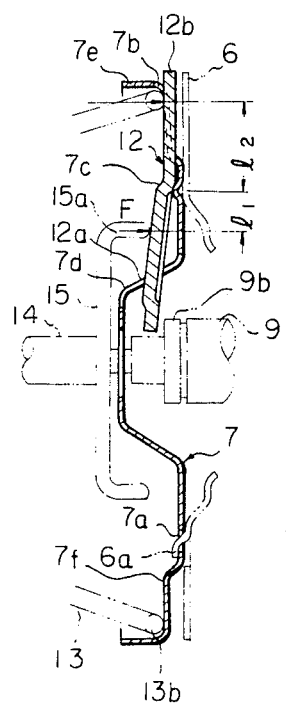
FIG. 3 is a view similar to FIG. 1 with the parts other than the retaining plate and the reaction lever being omitted.

Referring particularly to FIGS. 2 and 3, a plurality of (three in this embodiment) reaction levers 12 are positioned radially with respect to the axis of the servomotor. The radially inner and outer ends 12a and 12b of each of the reaction levers 12 are inserted respectively into openings or cut-out portions 7d and 7b of the retaining plate 7 whereby the reaction lever is retained and located on the front surface of the retaining plate 7. There are projecting portions 7c on the front surface of the retaining plate 7 to engage the rear surfaces of respective reaction levers 12 so that the reaction levers 12 can rockingly move in the clockwise and counter clockwise directions, as viewed in FIGS. 1 and 3, around the projecting portions 7c acting as fulcrums. There are flanges 7e and 7f on the retaining plate 7, and the flange 7f cooperates with circumferential shoulder portions of respective reaction levers 12 to prevent the radially outward movement of the reaction levers, and the flange 7e acts to locate the rear end 13b of a return spring 13 which will be described hereinafter. Further, each of the openings 7b in the retaining plate 7 has circumferentially spaced and radially extending edges 7b' for receiving therebetween the outer end portion 12b of each of the reaction levers 12 having correspondingly shaped edges 12b'.

The return spring 13 acts between the inner wall of the front shell 1A and the outer end portions 12b of respective reaction levers 12 thereby urging the retaining plate 7, the piston plate 6 and the valve body 5 in the rearward or return direction and, the reaction levers 12 are urged in the clockwise direction as viewed in FIGS. 1 and 3, and the radially inner ends 12a of the reaction levers 12 are spaced from a shoulder portion 9b of the plunger 9 in the unactuated condition of the servomotor. Preferably, the rear end portion 13b of the return spring 13 has an annular shape defining a plane perpendicular to the axis of the servomotor so that the return spring 13 uniformly acts on the outer end portions 12b of respective reaction levers 12.

An output rod 14 extends through the front shell 1A in sealing relation therewith with the forward end 14a thereof being connected to a piston or the like of a hydraulic master cylinder (not shown), and a fulcrum plate 15 is integrally secured to the output rod 14. The outer peripheral edge of the fulcrum plate 15 is bent rearwardly to form a bent portion 15a and abuts with projecting portions 12c formed on the front surfaces of respective reaction levers 12. Each bent portion 15a is at a position radially inwardly of respective projecting portions 7c of the retaining plate 7, while the end 13a of the return spring 13 is disposed radially outwardly of the projecting portion 7c.

A brief description will now be given of the operation of the servomotor having the construction as heretofore described. When the input rod 8 is moved forward by depressing the brake pedal or the like, the plunger 9 and the poppet valve 11 receiving the spring force of the spring 10 move forward in the valve body 5 which is stationary at that time. The poppet valve 11 engages with the valve seat 5b of the valve body 5 thus blocking the communication between the front chamber 3 and the rear chamber 5.

When the input rod 8 is further moved, the valve seat 9a of the plunger 9 separates from the poppet valve 11, and the atmospheric air passes through the clearance formed between the valve seat 9a and the poppet valve 11 and through the passage 5d and is introduced into the rear chamber 4.

Thus, pressure in the rear chamber 4 increases, so that there results a pressure difference between the chambers 4 and 3 and, as a result, the diaphragm 2, the valve body 5, the piston plate 6 and the retaining plate 7 move to the left together as viewed in FIG. 1 until the valve seat 9a engages again with the poppet valve 11. When the poppet valve 11 engages both of the valve seats 5b and 9a, the rear chamber 4 is cut off from both the front chamber 3 and the atmosphere, and the servomotor is in an equilibrium condition. A force acting on the power piston according to the pressure difference thereacross is transmitted to the output rod 14 through the reaction levers 12 and the fulcrum plate 15. Assuming that, as shown in FIG. 3, the distance between the projecting portions 7c acting as fulcrums for the rocking movement of the reaction levers 12 and the positions of the engagement between the fulcrum plate 15 and the reaction levers 12 is $l_1$, the distance between the projecting portions 7c and the positions of the engagement between the rear end portion 13b of the return spring 13 and the reaction levers 12 is $l_2$, the force of the return spring 13 is P, and the force transmitted to the fulcrum plate 15 or the reaction force thereof is F, then, the reaction levers 12 are maintained at the condition shown in FIG. 3 until the force F exceeds $P \times l_2/l_1$, so that the inner end portions 12a of the reaction levers 12 will not engage with the plunger 9 and no reaction force is transmitted from the reaction levers 12 to the input rod 8. Therefore, by suitably determining P, $l_1$ and $l_2$ it is possible to change the time at which the reaction of the output force is transmitted to the input rod for a given amount of the output force F.

When the force F exceeds $P \times l_2/l_1$, the reaction levers 12 pivot around the fulcrums 7c in the counterclockwise direction as viewed in FIG. 3, and a reaction force determined by the lever ratio of the reaction levers 12 is transmitted through the inner end portion 12a of the reaction levers 12 and the shoulder portion 9b of the plunger 9 to the input rod 8.

When the brake pedal is further depressed from the equilibrum condition, the rear chamber 4 will again be connected to the atmosphere while the front chamber 3 is disconnected from the rear chamber 4 and, as a result, the pressure in the rear chamber 4 is increased thus increasing the output force and, thereafter, the servomotor will take a new equilibrium condition.

Figure 4:
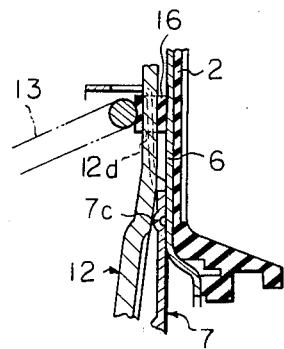
FIG. 4 is a partial cross-sectional view of a modified form of the invention.

FIG. 4 shows a modified form in which an elastic member 16 such as a rubber ring or the like is fitted around the outer end portion 12b of each of the reaction levers 12 for abutting with the rear end 13b of the return spring 13 and also with the piston plate 6, thus preventing the direct contact between metal parts and the generation of noisy sounds. In this embodiment, the rubber ring 16 is fitted in grooves or cut-out portions 12d formed in the side edges 12b' of the reaction lever 12.

Figure 5:
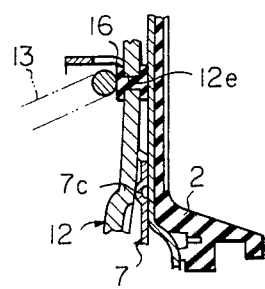
FIG. 5 is a view similar to FIG. 4 but showing a further modified form of the invention.

In FIG. 5, an elastic member 16 is fitted in an opening 12e in the reaction lever 12, but the function and effect thereof are similar to the rubber ring embodiment of FIG. 4.

In the disclosed embodiments, the power piston is constituted of three separate members, namely, the valve body 5, the piston plate 6 and the retaining plate 7, but these three members may be formed as a single member and, alternatively, the piston plate 6 and the retaining plate 7 or the valve body 5 and the piston plate 7 may be formed as a single member. Further, the configuration and arrangement of the reaction levers and the retaining plate may be changed as desired. For example, the projecting portions 7c acting as fulcrums for the rocking movement of the reaction levers may be replaced by wire rods or the like. Further, the fulcrum plate 15 may be replaced by a flange or yokes integrally formed on the output rod 14. Further, the present invention may be applied not only to vacuum type servomotors wherein the differential pressure is generated between the vacuum pressure and the atmospheric pressure, but also the pressure type servomotors wherein the differential pressure is generated between a high pressure and the atmospheric pressure or the vacuum pressure.

As is apparent from the foregoing description, the servomotor according to the present invention comprises a reaction lever rockingly mounted on the power piston for directly receiving the force of the return spring to transmit it to the power piston, and for transmitting the output force from the power piston to the output rod, and which lever also transmits the reaction of the output force to the input rod. Thus, the reaction of the output force will not be transmitted to the input rod until the output force exceeds a predetermined amount. The predetermined output force can be reliably determined as desired. No additional members are provided between the return spring and the reaction lever. Accordingly, the servomotor according to the present invention is well adapted for use in a vehicle braking system.

What is claimed is:

1. A fluid pressure operated servomotor comprising:
   a main body;
   a diaphragm and a power piston coacting to divide the interior of said main body into front and rear airtight chambers;
   a valve mechanism positioned in said power piston for controlling the pressure in at least one of said chambers;
   an input shaft connected to said valve mechanism for actuating said valve mechanism;
   an output rod means in said front chamber for transmitting the force of said power piston;
   a retaining plate mounted on the surface of said power piston facing said front chamber and having cut-outs therein extending radially outwardly;
   a plurality of reaction levers extending through respective cut-outs for being positioned on said power piston with the extremities of the radially inner end towards said rear chamber from said retaining plate and intermediate portions of the radially inner ends exposed toward said front chamber and the radially outer ends exposed toward said front chamber from said retaining plate, said retaining plate having fulcrums on a side toward the front chamber engaged by the respective reaction levers and about which said reaction levers pivot between one position in which the intermediate portions of the radially inner ends are engaged only with said output rod means for transmitting an output force from said power piston to said output rod means and a second position in which the extremities of the inner ends are engaged with said input rod for transmitting a reaction force to said input shaft and
   a return spring in said front chamber engaging the radially outer ends of said levers for biasing said power piston rearwardly.

2. A fluid pressure operated servomotor as set forth in claim 1 wherein said cut-outs in the retaining plate position the reaction levers relative to each other in the circumferential direction of said retaining plate.

3. A fluid pressure operated servomotor as set forth in claim 1 wherein said return spring also acts on said retaining plate.

4. A fluid pressure operated servomotor as set forth in claim 1 further comprising an elastic member between said return spring and the radially outer end portions of each of said reaction levers.

* * * * *